United States Patent
Hum et al.

(10) Patent No.: US 6,990,551 B2
(45) Date of Patent: Jan. 24, 2006

(54) SYSTEM AND METHOD FOR EMPLOYING A PROCESS IDENTIFIER TO MINIMIZE ALIASING IN A LINEAR-ADDRESSED CACHE

(75) Inventors: Herbert H. J. Hum, Portland, OR (US); Stephan J. Jourdan, Portland, OR (US); Per H. Hammarlund, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 8 days.

(21) Appl. No.: 10/917,449

(22) Filed: Aug. 13, 2004

(65) Prior Publication Data

US 2005/0027963 A1 Feb. 3, 2005

Related U.S. Application Data

(63) Continuation of application No. 09/751,258, filed on Dec. 29, 2000.

(51) Int. Cl.
*G06F 12/08* (2006.01)

(52) U.S. Cl. .......................... 711/3; 711/220; 711/216
(58) Field of Classification Search ................ 711/3, 711/220, 216
See application file for complete search history.

(56) References Cited

U.S. PATENT DOCUMENTS

| | | | | |
|---|---|---|---|---|
| 5,179,680 A | * | 1/1993 | Colwell et al. | 711/125 |
| 5,319,761 A | * | 6/1994 | Chiarot et al. | 711/207 |
| 5,509,135 A | * | 4/1996 | Steely, Jr. | 711/147 |
| 5,526,504 A | * | 6/1996 | Hsu et al. | 711/207 |
| 5,584,005 A | * | 12/1996 | Miyaoku et al. | 711/206 |
| 5,845,325 A | * | 12/1998 | Loo et al. | 711/135 |
| 6,298,411 B1 | * | 10/2001 | Giacalone | 711/3 |
| 6,430,670 B1 | * | 8/2002 | Bryg et al. | 711/216 |

OTHER PUBLICATIONS www.webopedia.com/TERM/H/hashing.html, dated Nov. 25, 1997.
http://www.rsasecurity.com/rsalabs/faq/2-1-6.html.
http://searchdatabase.techtarget.com/sDefinition/O,,sid13_gci212230,00.html.
Ivan B. Dåmgard, A design priniciple for hash functions, *Advances in Cryptology–Crypto '89*, Springer–Verlag (1990) 416 427.
Ralph C. Merkle, One way hash functions and DES, *Advances in Cryptology—Crypto '89*, Springer–Verlag (1990) 428–446.

* cited by examiner

*Primary Examiner*—Jack A. Lane
(74) *Attorney, Agent, or Firm*—Kenyon & Kenyon

(57) ABSTRACT

A system and method for reducing linear address aliasing is described. In one embodiment, a portion of a linear address is combined with a process identifier, e.g., a page directory base pointer to form an adjusted-linear address. The page directory base pointer is unique to a process and combining it with a portion of the linear address produces an adjusted-linear address that provides a high probability of no aliasing. A portion of the adjusted-linear address is used to search an adjusted-linear-addressed cache memory for a data block specified by the linear address. If the data block does not reside in the adjusted-linear-addressed cache memory, then a replacement policy selects one of the cache lines in the adjusted-linear-addressed cache memory and replaces the data block of the selected cache line with a data block located at a physical address produced from translating the linear address. The tag for the cache line selected is a portion of the adjusted linear address and the physical address produced from translating the linear address.

43 Claims, 6 Drawing Sheets

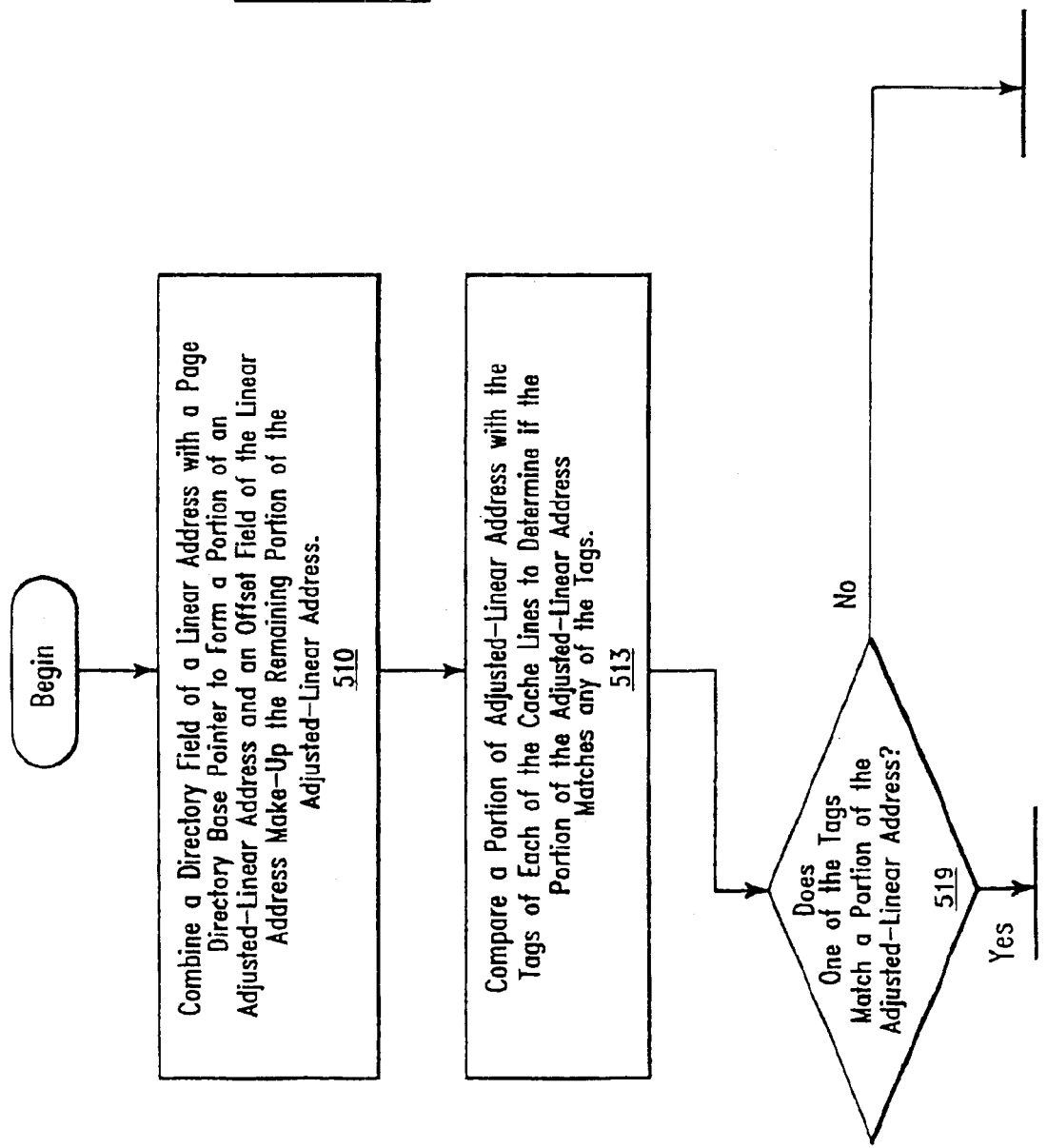

SYSTEM AND METHOD FOR EMPLOYING A PROCESS IDENTIFIER TO MINIMIZE ALIASING IN A LINEAR-ADDRESSED CACHE

CROSS REFERENCE TO RELATED APPLICATIONS

This application is a continuation of application Ser. No. 09/751,258 filed Dec. 29, 2000, the contents of which is incorporated herein in its entirety by reference thereto.

BACKGROUND OF THE INVENTION

I. Field of the Invention

This invention relates generally to computer technology, and more particularly, to improving processor performance in a computer system.

II. Background Information

The use of a cache memory with a processor facilitates the reduction of memory access time. The cache memory may be configured, among others, as an instruction cache, a data cache, or a translation lookaside buffer (cache that stores recently used page-directory and page-table entries). The fundamental idea of cache organization is that by keeping the most frequently accessed instructions and data in the fast cache memory, the average memory access time will approach the access time of the cache. It is generally understood that storage devices closer to the processor operate faster than storage devices farther away on the data path from the processor. However, there is a cost trade-off in utilizing faster storage devices. The faster the data access, the higher the cost to store a bit of data. Accordingly, a cache memory tends to be much smaller in storage capacity than main memory, but is faster in accessing the data.

In today's high-performance processor architectures, multi-level caches are employed to provide the most often referenced data to the execution units in a timely manner. For example, a two-level cache hierarchy is used so that the most often used data is stored in a small first-level cache that has a faster access time than a bigger second-level cache. The purpose of the bigger second-level cache is to capture the working set of an application in the cache and prevent the processor from having to access the slower main memory for data.

A virtual memory environment allows a large linear address space to be simulated with a small amount of physical memory (e.g., random access memory or read-only memory) and some disk storage. When a process references a logical address in memory, the processor translates the logical address into a linear address and then translates the linear address into a corresponding physical address. The physical address corresponds to a hardware memory location. A linear-to-physical address translation involves memory management hardware translating the linear address to the physical address. The linear-to-physical address translation is time consuming and waiting for this translation before performing an action (e.g., performing a cache lookup) increases the memory access time.

In order to decrease memory access time, a cache (e.g., the first-level cache in the above example) may be organized as a linear-addressed cache where the linear address of the memory request is used for the cache lookup rather than the physical address. The linear-addressed cache forgoes the linear-to-physical address translation before performing the cache lookup. Forgoing the linear-to-physical address translation decreases the memory access time. When using the linear-addressed cache, the linear-to-physical address translation is still performed because the physical address resulting from the translation is used to validate the data accessed in the cache using the linear address (i.e., check to ensure that the correct memory locations are accessed), but this linear-to-physical address translation is performed in parallel with the cache lookup. Performing the linear-to-physical address translation in parallel with the linear-addressed cache lookup improves the memory access time as the translation overhead is minimized due to the overlap with the cache lookup.

More than one process may execute on a processor. Typically, the linear-addressed cache is flushed when the processor switches from executing one process to executing another process. A cache flush occurs when the processor writes the valid and current data from its cache back into main memory. The cache flush diminishes processor performance as the processor may have to wait for completion of writes to the main memory. Moreover, data that would have been accessed after the cache flush that was in the cache before the flush, now has to be brought back into the cache. Therefore, cache flushes are avoided whenever possible in order to increase processor performance.

If a cache flush is not performed whenever a process switch occurs, then the linear-addressed cache may suffer from linear address aliasing. Linear address aliasing occurs when two separate processes running on the processor access the same cache line but those linear addresses map to different physical addresses (e.g., process one accesses linear address A and process two accesses linear address A but linear address A maps to different physical addresses). When linear address aliasing occurs, if the physical address, generated by performing a linear-to-physical address translation of the linear address, does not match a physical address within the tag of a cache line whose tag matches the linear address, then the data block provided (i.e., the data block within the cache line whose tag matches the linear address) is discarded, and the data block referenced by the linear address is brought into the linear-addressed cache from a storage device at a higher level in the memory hierarchy (e.g., main memory or the hard disk). This discarding of the provided data block and the resulting memory access (resulting from the linear address aliasing) to the slower storage device at the higher hierarchical level decreases processor performance.

For the foregoing reasons, there is a need to reduce the linear address aliasing problem between two or more processes, especially in a multi-threaded processor where these processes are run simultaneously.

DETAILED DESCRIPTION

In order to prevent linear address aliasing when using a linear-addressed cache memory (e.g., an instruction cache, a data cache, or a translation lookaside buffer), in an embodiment of the present invention, a process identifier that is unique to a process is combined with a portion or all of the linear address to form an adjusted-linear address. By combining the process identifier that is unique and a portion or all of the linear address, the resulting adjusted-linear address provides a high probability of no aliasing, and thus the possibility of linear address aliasing is reduced. The adjusted-linear address is used to search an adjusted-linear-addressed cache memory. The process identifier may be combined with the linear address by methods that include, among others, concatenating or hashing together the linear address and the process identifier.

The process identifier may be a page directory base pointer. Operating systems running on an Intel Architecture 32-bit ("IA-32") architecture (i.e., architectures employing an 8086, 80286, 80386, 80486, or Pentium® processor by Intel Corporation) may assign a different page directory to each process and each of these page directories are uniquely identified by the page directory base pointer. Combining the page directory base pointer with the linear address is particularly beneficial for multi-threaded execution (i.e., executing several processes in rapid sequence). Multiple threads (a thread is a process that is part of a larger process or program) can share the adjusted-linear-addressed cache memory, and separating the cache lines between the threads results in less negative impact of a thread thinking that it is operating on the right data, but later having to be corrected (a linear-addressed cache includes the associated physical address for each cache line and there is a final check of the translated address to the stored physical address before the memory request is deemed valid). Moreover, if a process running as thread x is suspended and later is reactivated as thread y, the page directory base pointer for thread y remains the same as that for thread x and thus thread y can still access the cache lines that thread x fetched into the adjusted-linear-addressed cache memory.

Combining the page directory base pointer and the linear address by methods that include concatenating or hashing is a faster operation than performing a linear-to-physical address translation, as the page directory base pointer is quickly available in a register. Performing a linear-to-physical address translation, however, uses a memory access (e.g., the memory access may be to the cache or main memory; the memory accesses take longer than accessing the register) to obtain the linear address to physical address mapping.

Figure 1:
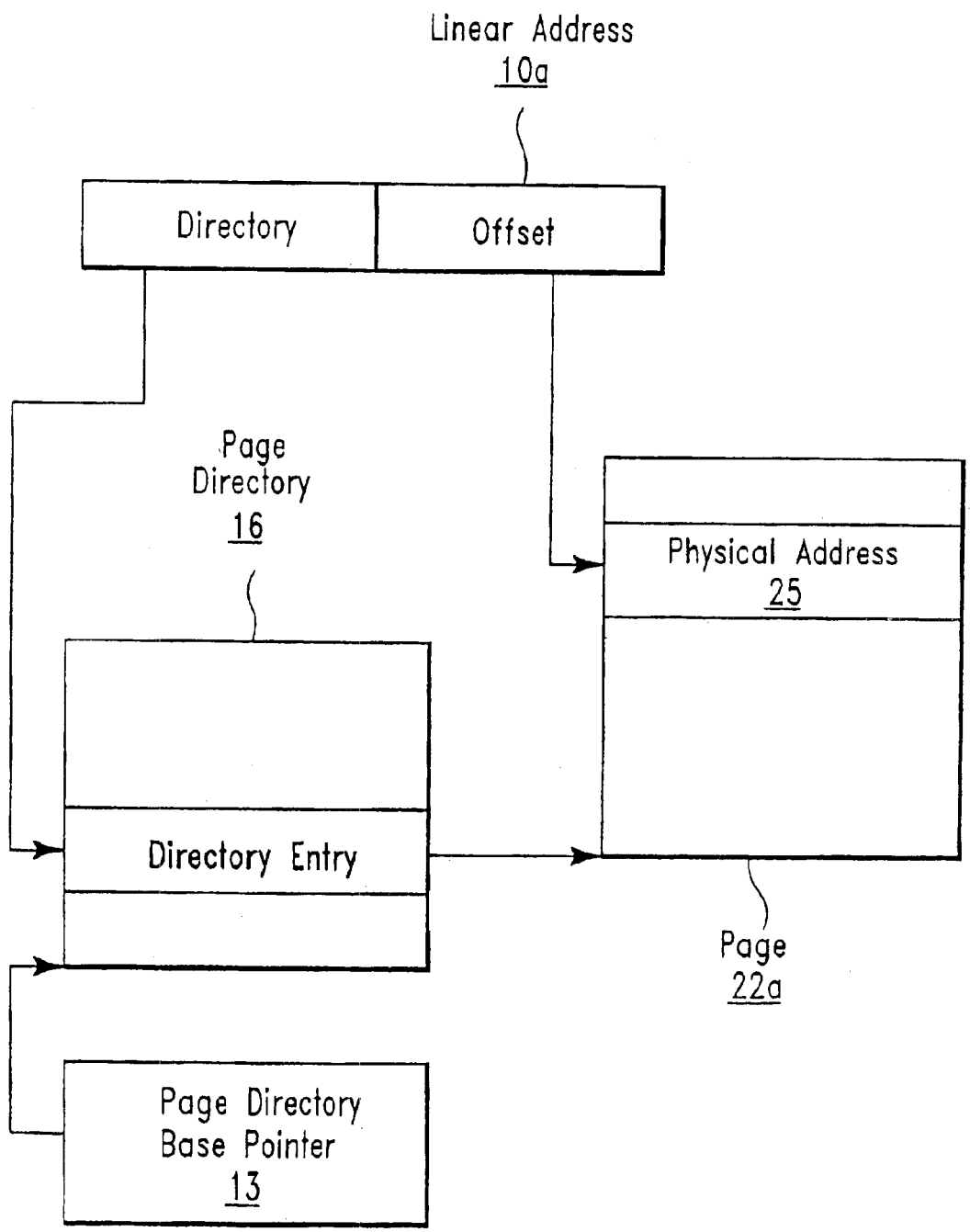
FIG. 1 shows a linear-to-physical address translation in which a page table is not used to obtain the physical address.

FIG. 1 shows a linear-to-physical address translation in which a page table is not used to obtain the physical address. Here, a page directory base pointer 13 holds the base physical address for a page directory 16. Each process has a unique page directory 16. Each process also has a unique page directory base pointer 13. Page directory base pointer 13 is used to access page directory 16. The directory field of a linear address 10*a* provides an offset to a directory entry. The directory entry provides a base physical address for a page 22*a*. The offset field of linear address 10*a* provides an offset to a physical address 25 within page 22*a*.

Figure 2:
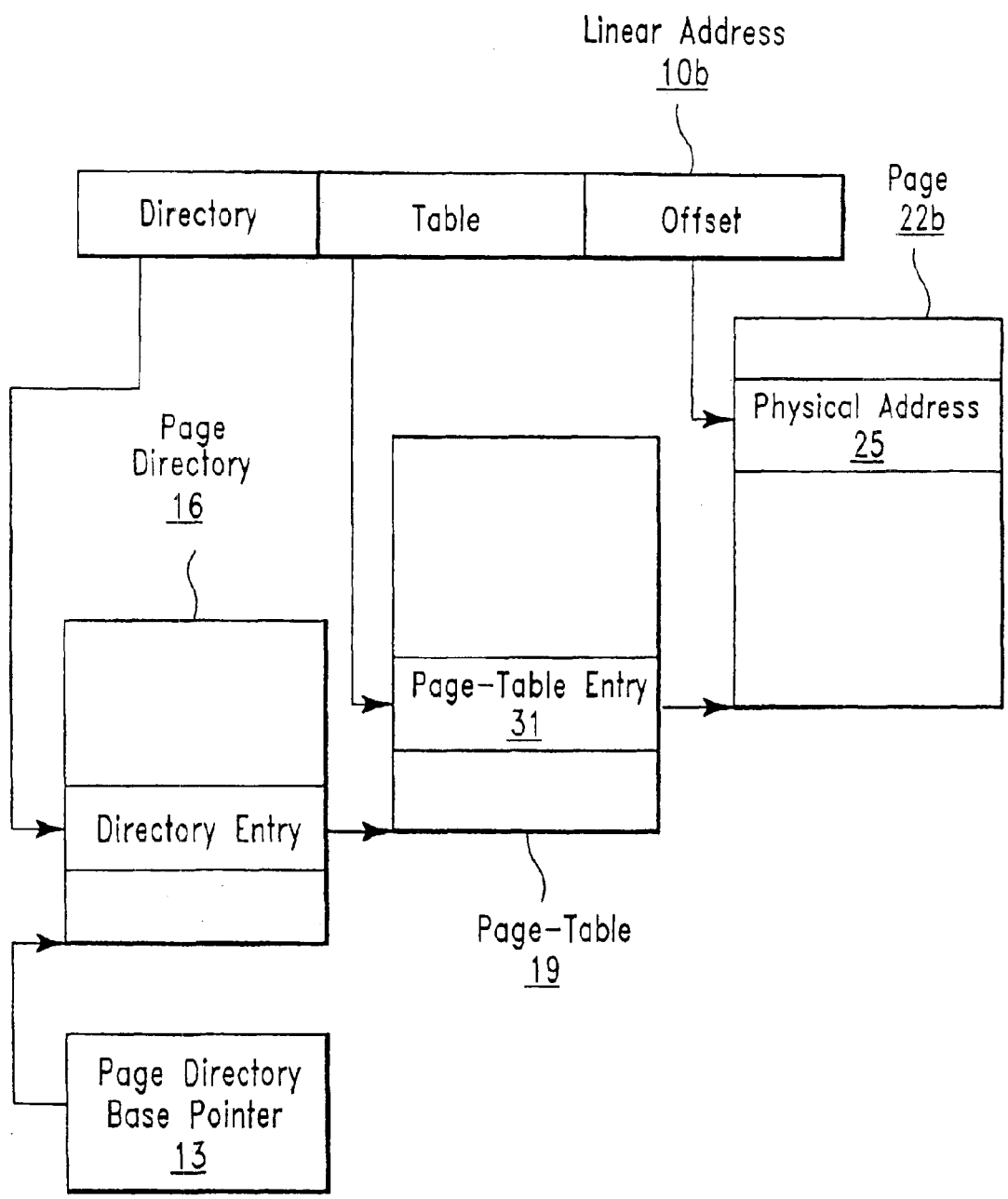
FIG. 2 shows a linear-to-physical address translation in which a page table is used to obtain the physical address.

FIG. 2 shows a linear-to-physical address translation in which a page table is used to obtain the physical address. Here, page directory base pointer 13 is used to access page directory 16. A directory field of a linear address 10*b* provides an offset to a directory entry in page directory 16. The directory entry provides a base physical address of a page table 19. A table field of linear address 10*b* provides an offset to a page-table entry 31. Page-table entry 31 provides a base physical address of a page 22*b*. The offset field of linear address 10*b* provides an offset to physical address 25 within page 22*b*.

Figure 3:
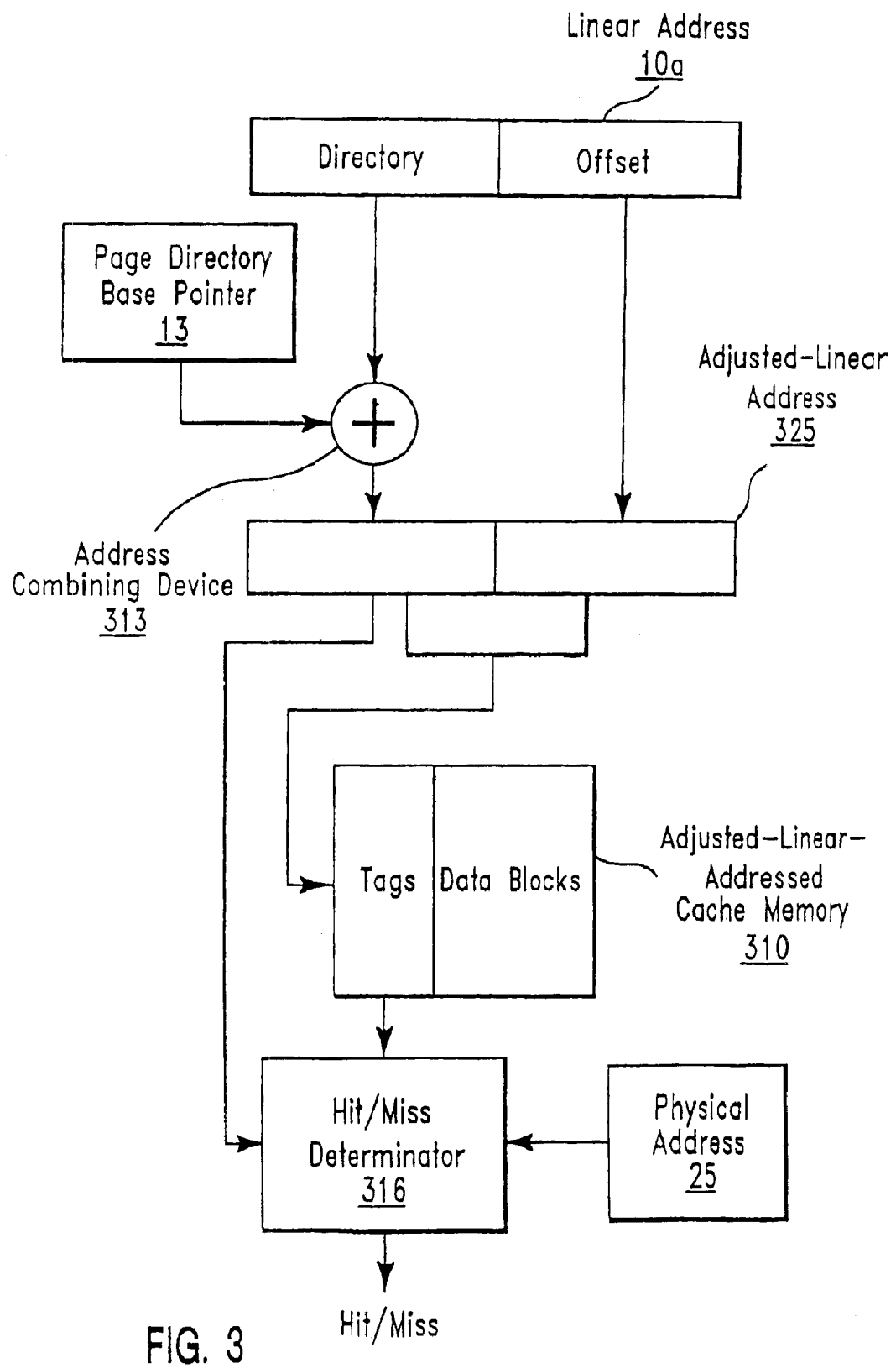
FIG. 3 shows a block diagram of an adjusted-linear-addressed cache memory system according to an embodiment of the present invention.

FIG. 3 shows a block diagram of an adjusted-linear-addressed cache memory system according to an embodiment of the present invention. In this embodiment, address combining device 313 combines a portion of linear address 10*a*, e.g., the portion of linear address 10*a* may be the directory field of linear address 10*a*, with the process identifier, e.g., a page directory base pointer 13, to produce a portion of an adjusted-linear address 325. The offset field of linear address 10*a* provides the remaining portion of adjusted-linear address 325. As stated earlier, page directory base pointer 13 is unique to a process and the resulting adjusted-linear address 325 provides a high probability of no aliasing. Address combining device 313 combines page directory base pointer 13 and the directory field of linear address 10*a* using methods that include hashing and concatenating. Adjusted-linear address 325 is used to search an adjusted-linear-addressed cache memory 310. Adjusted-linear-addressed cache memory 310 includes cache lines and each of the cache lines has a tag and a data block. The tag for a particular cache line includes a portion of adjusted-linear address 325 and the physical address corresponding to adjusted-linear address 325.

A hit/miss determinator 316 determines if the data block referenced by adjusted-linear address 325 resides in adjusted-linear address cache memory 310. Hit/miss determinator 316 searches the tags of the cache lines to determine if any of the tags match a portion of adjusted-linear address 325 (e.g., the portion of adjusted-linear address 325 may be the address formed by address combining device 313 combining the directory field of linear address 10*a* with page directory base pointer 13). If a tag matches a portion of adjusted-linear address 325, then hit/miss determinator 316 compares the physical address stored within that tag with physical address 25 generated from the linear-to-physical address translation of linear address 10*a* as described in FIG. 1. This linear-to-physical address translation is performed in parallel with the searching of adjusted-linear-addressed cache memory 310. If the physical address stored within that tag matches physical address 25, then the data block referenced by linear address 10*a* resides in adjusted-linear-addressed cache memory 310 and can be accessed. If, however, none of the tags match a portion of adjusted-linear address 325 or the physical address stored within that tag does not match physical address 25, then a replacement policy is used to replace the data block in one of the cache lines selected by the replacement policy with the data block referenced by linear address 10*a* and found in a storage device that is at a higher level in the memory hierarchy (e.g., main memory or the hard disk). The new tag for the cache line selected includes a portion of adjusted-linear address 325 and physical address 25.

Figure 4:
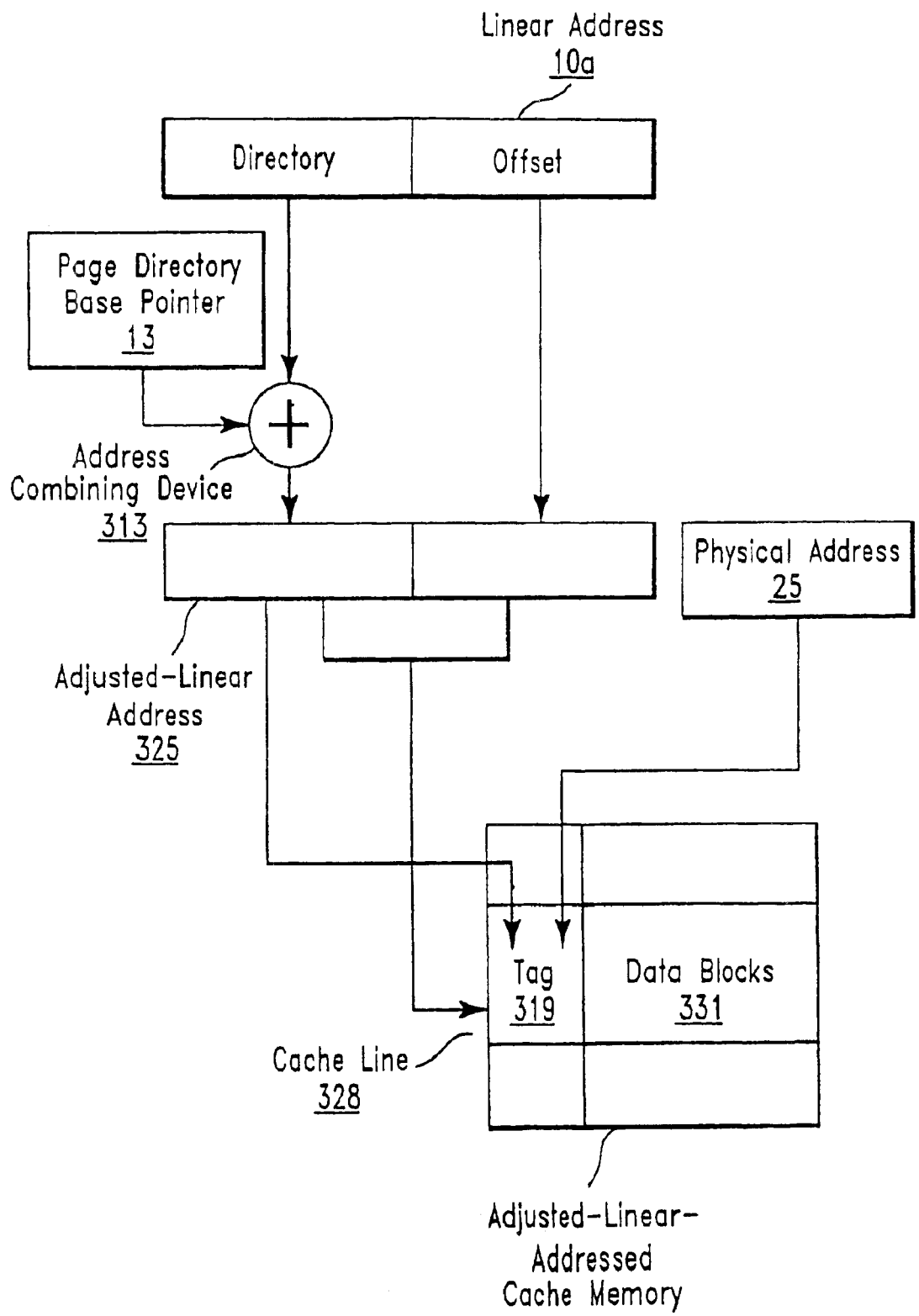
FIG. 4 shows a block diagram of an adjusted-linear-addressed cache memory replacing system according to an embodiment of the present invention.

FIG. 4 shows a block diagram of an adjusted-linear-addressed cache memory replacing system according to an embodiment of the present invention. If the data block referenced by linear address 10*a* does not reside in adjusted-linear-addressed cache memory 310, then one of the cache lines, as selected by a replacement policy, of adjusted-linear-addressed cache memory 310 is replaced with the data block that is referenced by linear address 10*a* and the tag for this cache line is set accordingly. In FIG. 4, assume that the data block referenced by linear address 10*a* does not reside in adjusted-linear-addressed cache memory 310 and a cache line 328 is selected by the replacement policy to hold the data block referenced by linear address 10*a*. Cache line 328 includes a tag 319 and a data block 331. Tag 319 includes physical address 25 which is found by performing the linear-to-physical address translation of linear address 10a as described earlier in FIG. 1. Tag 319 also includes a portion of adjusted-linear address 325. The portion of adjusted-linear address 325 included in tag 319 may be the address formed by address combining device 313 combining the directory field of linear address 10a with page directory base pointer 13. Data block 331 is the data block referenced by linear address 10a and because this data block did not previously reside in adjusted-linear-addressed cache memory 310, it was fetched, using physical address 25, from a storage device at a higher level in the memory hierarchy.

Figure 5B:
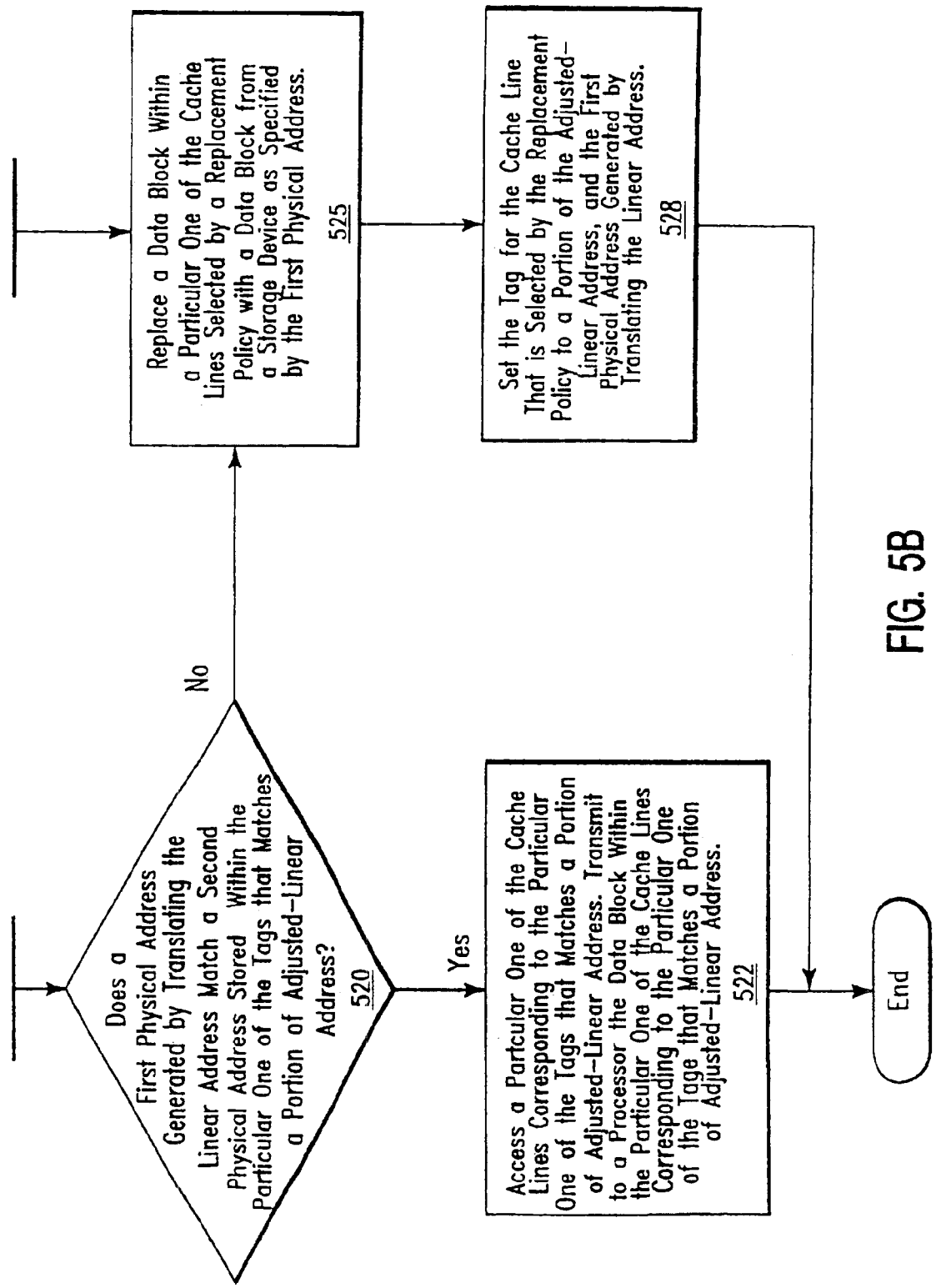
FIG. 5 shows a flowchart describing the process for searching and populating the adjusted-linear-addressed cache memory according to an embodiment of the present invention.

FIG. 5 shows a flowchart describing the process for searching and populating adjusted-linear-addressed cache memory 310 according to an embodiment of the present invention. In this embodiment, in block 510, address combining device 313 combines a directory field of linear address 10a with page directory base pointer 13 to form a portion of adjusted-linear address 325 and an offset field of linear address 10a is the remaining portion of adjusted-linear address 325. The linear address and the page directory base pointer are combined by methods that include concatenating and hashing. In block 513, hit/miss determinator 316 compares a portion of adjusted-linear address 325 with the tags of each of the cache lines of adjusted-linear-addressed cache memory 310 to determine if the portion of adjusted-linear address 325 matches any of these tags (i.e., to determine if a data block addressed by adjusted-linear address 325 resides in adjusted-linear-addressed cache memory 310).

In conditional block 519, hit/miss determinator 316 determines if one of the tags matches a portion of adjusted-linear address 10a. If one of the tags matches a portion of adjusted-linear address 325, then in conditional block 520, hit/miss determinator 316 determines if physical address 25, generated by performing the linear-to-physical address translation of linear address 10a (as shown in FIG. 1), matches a second physical address stored within the particular one of the tags that matches a portion of adjusted-linear address 325. If the two physical addresses match, then in block 522, the data block within the particular one of the cache lines corresponding to the particular one of the tags that matches a portion of adjusted-linear address 325 is transmitted to a processor for manipulation. If none of the tags match a portion of adjusted-linear address 325, or physical address 25 does not match the second physical address, then in block 525, the data block within a particular one of the cache lines selected by a replacement policy is replaced with a data block located at physical address 25 within a storage device at a higher level in a memory hierarchy. In block 528, the tag for the cache line that is selected by the replacement policy is set to a portion of adjusted-linear address 325 and physical address 25 generated by translating linear address 10a.

Although unlikely, linear address aliasing may still exist when the process identifier is combined with the linear address, and therefore the replacement policy corrects data blocks in adjusted-linear-addressed cache memory 310 having the same adjusted-linear address but mapping to different physical addresses. This memory coherency may be done by, among others, the following strategies: (1) ensuring that only one copy of a data block is present in the cache at a given time (i.e., remove duplicate data blocks mapping to the same physical address); (2) invalidating duplicate copies of data blocks on a write (i.e., remove duplicate data blocks if one of the data blocks is modified); and (3) update all copies of data blocks when one of the data blocks is written. To assent to strategy (1), the number of translated bits (i.e., the bits in the portion of adjusted-linear address 325 formed by combining page directory base pointer 13 with the directory field of linear address 10a) used to index adjusted-linear-addressed cache memory 310 should be kept to a minimum in order to keep to a minimum the number of sets that are searched for duplicate data blocks.

In an alternative embodiment, page-table entry 31 is combined with linear address 10b to reduce linear address aliasing and also to allow multiple processes to share pages. In this embodiment, the corresponding page table entry 31 is combined with a first portion of the linear address (e.g., the first portion of the linear address may be the directory field of the linear address) to form a portion of the adjusted-linear address. The tag of each of the cache lines in the linear-addressed cache also includes the portion of the adjusted-linear address corresponding to that cache line. The linear-addressed cache is indexed using a second portion of the linear address (e.g., the second portion of the linear address may be the offset field of the linear address). Because page table entry 31 is obtained during the linear-to-physical address translation (i.e., page table entry 31 is not immediately available and a memory access (e.g., a cache access or main memory access) is used to obtain page table entry 31), page table entry 31 is not used to index the linear-addressed cache, but rather the second portion of the linear address is used to index the linear-addressed cache.

The portion of the adjusted-linear address stored within the tag for the cache line indexed is compared to the page table entry 31 combined with the first portion of the linear address. If these two addresses do not match, then the data block referenced by the linear address does not reside in the linear-addressed cache and thus must be fetched from the storage device at the higher level in the memory hierarchy. If the two addresses do match, however, then the physical address stored within the tag is compared to the physical address obtained from performing the linear-to-physical address translation. If these two addresses do not match, then the data block referenced by the linear address does not reside in the linear-addressed cache and thus must be fetched from the storage device at the higher level in the memory hierarchy. If the two addresses do match, however, then the data block referenced by the linear address does reside in the linear-addressed cache and is sent to the processor for processing. In this embodiment, by combining the linear address with page table entry 31, linear address aliasing is reduced while still allowing different processes to share pages as those shared pages will have the same page table entry 31.

In alternative embodiments, linear address 10b is used rather than linear address 10a, and in this case, the directory field of linear address 10b is combined with page directory base pointer 13 to form a portion of adjusted-linear address 325. The table field and the offset field of linear address 10b are the remaining portions of adjusted-linear address 325. In other embodiments, fields, other than the directory field, or all of the linear address are combined with the process identifier to form the adjusted-linear address. Embodiments of the present invention are not limited to combining linear addresses having the format of linear address 10a or linear address 10b, but rather, linear addresses of any format can be combined with the process identifier to form the adjusted-linear address. Also, the tag for each of the cache lines may include all or a portion of the linear address or the adjusted-linear address, and thus all or a portion of linear address or the adjusted-linear address is used for the tag matching.

Although embodiments are specifically illustrated and described herein, it will be appreciated that modifications and variations of the present invention are covered by the above teachings and within the purview of the appended claims without departing from the spirit and intended scope of the invention.

What is claimed is:

1. A method comprising:

hashing a process identifier unique to a process with a linear address to form an adjusted-linear address;

comparing the adjusted-linear address with a tag associated with each cache line of a plurality of cache lines to determine whether the adjusted-linear address is included in the tag; and transmitting a data block corresponding to a cache line to a processor, if the adjusted-linear address is included in the tag corresponding to the cache line of the plurality of cache lines.

2. The method of claim 1, further comprising:

determining whether a first physical address stored within the tag matches a second physical address generated by translating the linear address; and transmitting the data block to the processor, if the first physical address stored within the tag matches the second physical address.

3. The method of claim 2, further comprising:

replacing the data block using a replacement policy, if the second physical address does not match the first physical address stored within the tag.

4. The method of claim 1, further comprising:

replacing a data block within a particular one of the cache line that is selected by a replacement policy with a data block from a storage device as specified by the second physical address, if the adjusted-linear address is not included in the tag.

5. The method of claim 1, further comprising:

concatenating the process identifier with the linear address.

6. The method of claim 1, wherein the process identifier is a page directory base pointer that is a physical address of a base of a page directory.

7. The method of claim 1, wherein the process identifier resides in a register.

8. The method of claim 1, wherein the adjusted-linear address is formed by combining the process identifier with a portion of the linear address.

9. The method of claim 8, wherein the portion of the linear address that is combined is a directory field of the linear address.

10. The method of claim 1, wherein the adjusted-linear address is compared with each tag, wherein each tag includes a corresponding adjusted-linear address.

11. A system comprising:

an address combining device to hash a process identifier unique to a process with a portion of a linear address to form an adjusted-linear address;

an adjusted-linear-addressed cache memory that includes a plurality of cache lines, each of the cache lines includes a tag and a data block;

a hit/miss determinator to search the cache memory to determine whether the adjusted-linear address is included in the tag; and a processor to receive the data block that corresponds to the cache line, if the adjusted-linear address is included in the tag.

12. The system of claim 11, further comprising:

a physical memory, wherein if the adjusted-linear address is included in the address, the hit/miss determinator to compare a physical address stored within the tag with a physical address generated from the linear-to-physical address translation of a linear address.

13. The system of claim 12, wherein if the hit/miss determinator determines that the first physical address matches the second physical address, transmitting the data block to the processor.

14. The system of claim 12, wherein if the hit/miss determinator determines that the first physical address does not match the second physical address, replacing the data block using a replacement policy.

15. The system of claim 11, wherein the address combining device to concatenate together the process identifier with the linear address to form the adjusted-linear address.

16. The system of claim 11, wherein the process identifier is a page directory base pointer that is a physical address of a base of a page directory.

17. The system of claim 11, further comprising:

a register to store the process identifier.

18. A method comprising:

indexing a cache line referenced by a linear address;

hashing a page table entry with the linear address to form an adjusted-linear address;

comparing the adjusted-linear address with a first portion of a tag corresponding to the cache line referenced to determine whether the adjusted-linear address matches the first portion of the tag; and comparing a second portion of the tag with a first physical address generated by translating the linear address, if the adjusted-linear address matches the first portion of the tag.

19. The method of claim 18, further comprising:

transmitting a data block within the cache line to a processor if the adjusted-linear address matches the first portion of the tag.

20. The method of claim 18, further comprising:

replacing a data block within the cache line that is selected by a replacement policy with a data block from a storage device as specified by the first physical address if the adjusted-linear address does not match the first portion of the tag, and the first physical address does not match the second portion of the tag, wherein the first portion of the tag corresponding to the cache line that is selected is the adjusted-linear address, and the second portion of the tag is a second physical address of the data block from the storage device.

21. The method of claim 18, further comprising:

concatenating together the page table entry with the linear address.

22. The method of claim 18, wherein the cache line is indexed using a first portion of the linear address.

23. The method of claim 22, wherein the first portion of the linear address is an offset field of the linear address.

24. The method of claim 18 further comprising:

transmitting a confirmation signal, if the second portion of the tag matches the first physical address.

25. The method of claim 18, further comprising:

transmitting an invalidation signal, if the second portion of the tag does not match the first physical address.

26. A method comprising:

hashing a process identifier unique to a process with a linear address to form an adjusted-linear address;

comparing the adjusted-linear address with a tag associated with each cache line of a plurality of cache lines to determine if the adjusted-linear address is included in the tag;

transmitting a data block corresponding to a cache line to a processor, if the adjusted-linear address is included in the tag corresponding to the cache line of the plurality of cache lines;

determining whether a first physical address stored within the tag matches a second physical address generated by translating the linear address; and transmitting the data block to the processor, if the first physical address stored within the tag matches the second physical address.

27. The method of claim 26, wherein the adjusted-linear address contains less information than a combined process identifier and linear address.

28. The method of claim 26, wherein the adjusted-linear address is a function of the process identifier and the linear address.

29. The method of claim 26, further comprising:

replacing the data block using a replacement policy, if the second physical address does not match the first physical address stored within the tag.

30. The method of claim 29, further comprising:

replacing a data block within a particular one of the cache line that is selected by a replacement policy with a data block from a storage device as specified by the second physical address, if the adjusted-linear address is not included in the tag.

31. An apparatus comprising:

a processor to receive and execute an instruction to cause a request to made for a data block located at a logical memory address, the processor to translate the logical memory address into a linear address and request the data block from a first memory using the linear address, and the processor further to receive the data block from the first memory in response to the request if the data block is located in the first memory using an adjusted-linear address formed by hashing a process identifier unique to a process with the linear address.

32. The appartus of claim 31 wherein the first memory comprises:

a linear-addressed cache memory.

33. The apparatus of claim 31 wherein the hashing of the process identifier unique to the process with the linear address comprises:

hashing the process identifier unique to the process with a portion of the linear address to form the adjusted-linear address.

34. The apparatus of claim 31 further comprising:

hashing the process identifier unique to the process with the linear address to form the adjusted-linear address.

35. The apparatus of claim 31 further comprising:

the processor further to receive the data block through the first memory from a second memory in response to the request if the data block is not located in the first memory using an other adjusted-linear address formed by hashing an other process identifier unique to an other process with the linear address.

36. The apparatus of claim 31 further comprising:

the processor to receive and execute an other instruction to cause an other request to be made for the data block located at the logical memory address, the processor to translate the logical memory address into the linear address and request the data block from the first memory using the linear address, and the processor further to receive the data block from the first memory in response to the request if the data block is located in the first memory using an other adjusted-linear address formed by hashing the other process identifier unique to an other process with the linear address.

37. A processing system comprising:

an address combining device to hash a process identifier unique to a process with a linear address to form an adjusted-linear address;

an adjusted-linear-addressed cache memory that includes a plurality of cache lines, each of the cache lines includes a tag and a data block;

a hit/miss determinator to search the cache memory to determine whether the adjusted-linear address is included in the tag; and a processor to receive the data block that corresponds to the cache line, if the adjusted-linear address is included in the tag.

38. The system of claim 37, further comprising:

a physical memory, wherein if the adjusted-linear address is included in the address, the hit/miss determinator to compare a physical address stored within the tag with a physical address generated from the linear-to-physical address translation of a linear address.

39. The system of claim 38, wherein if the hit/miss determinator determines that the first physical address matches the second physical address, transmitting the data block to the processor.

40. The system of claim 38, wherein if the hit/miss determinator determines that the first physical address does not match the second physical address, replacing the data block using a replacement policy.

41. The system of claim 37, wherein the address combining device to concatenate together the process identifier with the linear address to form the adjusted-linear address.

42. The system of claim 37, wherein the process identifier is a page directory base pointer that is a physical address of a base of a page directory.

43. The system of claim 37, further comprising:

a register to store the process identifier.

* * * * *

UNITED STATES PATENT AND TRADEMARK OFFICE
CERTIFICATE OF CORRECTION

PATENT NO. : 6,990,551 B2 Page 1 of 1
APPLICATION NO. : 10/917449
DATED : January 24, 2006
INVENTOR(S) : Hum et al.

It is certified that error appears in the above-identified patent and that said Letters Patent is hereby corrected as shown below:

Column 9, line 30, please correct the line to read as follows:

a request to be made for a data block located at a logical

Signed and Sealed this

Twenty-ninth Day of August, 2006

JON W. DUDAS
*Director of the United States Patent and Trademark Office*